United States Patent [19]

Dick

[11] 3,770,593

[45] Oct. 30, 1973

[54] ACCELERATED TEST METHOD FOR DETERMINING COATING ADHERENCE AND ABILITY TO WITHSTAND CORROSION

[75] Inventor: Robert M. Dick, Grossee Ile, Mich.

[73] Assignee: Ciba-Geigy Corporation, Greenburgh, N.Y.

[22] Filed: Oct. 1, 1971

[21] Appl. No.: 185,848

[52] U.S. Cl. .................................. 204/1 T
[51] Int. Cl. ........................................ G01n 27/46
[58] Field of Search .............. 204/1 T, 195 R, 18 R, 204/129.65

[56] References Cited
UNITED STATES PATENTS

| | | | |
|---|---|---|---|
| 3,366,554 | 1/1968 | Lindblad | 204/1 T |
| 3,223,598 | 12/1965 | Jacky et al. | 204/1 T |
| 2,492,214 | 12/1949 | Fonda | 204/129.65 |
| 2,306,082 | 12/1942 | Prest | 204/129.65 |
| 2,691,627 | 10/1954 | Johnson | 204/18 R |
| 3,331,760 | 7/1967 | Powell | 204/129.65 |

Primary Examiner—T. Tung
Attorney—Karl F. Jorda et al.

[57] ABSTRACT

Testing of a coated sample containing a nonconductive coating and a conductive base involves exposing a coating-base interface to oxidative conditions through immersion in an electrolytic bath. The test sample is made the anode by connection to a source of direct current and the coating adjacent the interface is periodically evaluated for corrosion or blistering. Coating adherence can be determined by a tensile pull such as through a tape adhered to the coating.

10 Claims, No Drawings

ACCELERATED TEST METHOD FOR DETERMINING COATING ADHERENCE AND ABILITY TO WITHSTAND CORROSION

BACKGROUND OF THE INVENTION

The present invention is considered to be in two distinct areas in the testing of coatings. This invention discloses an accelerated testing procedure that allows the determination of the ability of a coating to protect a substrate in an environment causing corrosion. Additionally this method in conjunction with the corrosion testing technique allows the determination of the coating adherence under the test conditions. The present technique allows a simplified procedure bypassing known laborious and expensive procedures.

There are many known techniques in the prior art for determining the susceptability of a coating on a substrate to withstand present day atmospheric or other corroding environments.

A common procedure utilized extensively is the so-called salt spray method which gives an indication of the corrosion resistance of a protective coating on a metal. This testing method briefly involves exposure of a coated test panel to a 5 percent salt spray for an extensive time period. The duration required for a test cycle normally takes hundreds of hours. Relatively expensive equipment with support personnel is necessitated. Another important disadvantage is considered present with the salt spray method. For example when employing a substrate such as iron, an oxide film is formed which has a self-passivating effect. It has been questioned whether a salt-spraying technique represents an accurate testing method when correlated to usage under field conditions. When rusting of the iron takes place upon penetration of the salt through a coated specimen the effect of oxide film tends to decrease further corrosion. Unless mechanical means such as vibration are utilized periodically to destroy the homogenuity of the oxide for correlation with field utilization, the test procedure may become inexact.

An additional disadvantage of the salt-spraying test is in production line testing to determine whether a specific coating meets standards in effect. This testing technique does not provide the flexibility for rapid in-line testing for immediate correction of production line defects.

Many other testing techniques are well known such as use of corrosion environments produced by high humidity and/or high temperature, electrochemical methods and the like. However their accuracy, ease of application and time limitation, and use on specific materials has not provided superior test data correlated to field use for a large number of potential test specimens.

The present test method involves the use of oxidative conditions involving at least some degradation of an article having a nonconductive coating on a conductive base. Due to this degradation, this test method is considered to fall within the general area of destruction testing.

An outstanding advantage the present test method is the relatively short duration required for complete testing. The ability of a coating to withstand corrosion and provide adherence may be measured in a matter of several hours such as three or four hours. In contrast the widely used salt spray method normally requires a test time involving hundreds of hours.

THE INVENTION

The present invention is directed to a testing technique involving the utilization of a direct electric current to simulate corrosion conditions in a relatively short time period. While it is well known to employ an electric current for a wide variety of techniques such as electrolytic cleaning, electroplating, anodizing, electrostatic spraying, etc., the utilization of an electric current to determine susceptability of a nonconductive coating to corrosion has not been utilized. The use of electric current has been employed upon conductive surfaces in determining corrosion resistance. Also the use of an electric current and an electrical potential has been employed to determine the dielectric strength of a nonconductor or the absence of pinholes in the dielectric. However the use of an electric current has not been directly employed in determining the corrosion resistance of a conductor-dielectric combination. Additionally an electric current has not been employed preliminarily to a determination of the adhesion of a coating material.

The present technique may be employed in conjunction with equipment known in the art as for example that utilized for electrolytic cleaning. However this method differs over the prior art processes in that the present disclosure is drawn to a testing procedure per se and uses specific operating conditions.

The required embodiment utilizes a nonconductive coating upon a conductive base. Any nonconductive coating may be employed in the present disclosure which coating will have dielectric properties. Nonconductive in the present context is employed in its normal definition in relationship to the passage of electric current. It will be recognized that the degree of nonconductiveness will vary with different coatings since their insulating properties will be different. Illustrative of suitable nonconductive coatings are plastics or resins such as employed in forming a paint. However any nonconducting material can be utilized.

A conductive material will be employed with the electrolytic testing procedure disclosed herein. Conductive in the present context is employed in its normal definition in relationship to the passage of electric current. A suitable class of substrates are metals particularly iron alloys.

While it may be considered only a matter of semantics, it is within the scope of this invention that any combination of nonconductive-conductive materials be employed. For example the coating may be conductive and the substrate nonconductive. Alternatively a laminate containing a nonconductive and a conductive layer may be used. In the present employment it is understood that a substrate and coating combination is intended to denote a combination of two different materials having an area coextensive with one another. A conductive and nonconductive cross section will be present for the test method.

For the purposes of this disclosure a conductive portion will be referred to a metal although it will be understood that any conductive material may be employed. Additionally while metals vary in their resistance to withstand conditions causing corrosion, nevertheless for the purposes of illustration, a steel such as that used in car bodies will be employed for purposes of explanation. For illustrative purpose the nonconductive coating will be referred to as a paint.

In use the sheet metal of a car body undergoes rapid corrosion if it is not fully protected with a protective coating. Therefore the aesthetic function of an employed paint may be considered of secondary importance. The ability of the paint to provide adherence free of pinholes and cracks is essential and relates to its film forming properties. In conjunction the coating should have sufficient impermeability to water in order to minimize diffusion of corroding substances beneath the surface of the film. Therefore the ability of the coating to withstand corrosion and to provide good adherence properties over prolonged time periods is essential.

For testing, a coated specimen is employed and is desirably scribed to expose an area of the metal substrate adjacent to nonconductive coating. However scribing of the coating is not absolutely essential so long as an area exists wherein the substrate is exposed adjacent to coating. However scribing is desirable in that a fresh metal surface is exposed. The coated-uncoated portion serves as a test area wherein the evaluation of the coating substrate interface takes place during the testing procedure.

If the coating is scribed to expose the base metal, the width of the scribe is not critical. In contrast criticality resides in the fact that an area exists where there is an exposed interface to oxidative conditions.

The method briefly involves at least partial immersion of a test specimen in a liquid capable of carrying an electric current. This electrolytic procedure can employ any of a variety of liquids capable of carrying an electric current. For purposes of illustration a suitable electrolyte may be common table salt dissolved in water. The sole criticality of the electrolyte is that it be capable of carrying an electric current.

A direct source of current is employed in the testing product. The coated test panel is made the anode by connecting to a direct current source. Into the electrolyte, a cathode portion is at least partially immersed to complete the procedure to initiate the test conditions. Any conducting material may be employed as the cathode. Thereafter oxidative conditions will be present at the surface of the test specimen and accelerated corrosion is considered to take place.

In the present disclosure with the conducting-nonconducting specimen combination, corrosion is considered to be electrochemical in nature. The present test method is considered to accelerate the conditions taking place in comparison to long term use of the test article.

In usage a direct current is impressed upon the test specimen so that accelerated corrosion takes place due to the oxidative conditions at the anode which is the test specimen. A current of several amps such as 2 or 3 amps may be employed. At this current strength rapid corrosion of the metal substrate ordinarily will take place. It is more preferable a current below one amp such as .5 amps be utilized since the corrosion rate of the metal is diminished and in many uses more accurate test results can be obtained. With use of excessive current the coating may be undercut. In such event the substrate corrodes or is destroyed rapidly that the time duration is generally quite short to clearly and accurately check the interface between the substrate and the coating. A most desirable current strength is of the order of 0.3 to 0.4 amps.

There is considered to be no minimum current to be employed to obtain the test results although practically speaking extremely low currents will cause extensive test times. Generally a current of such as 10 milliamps is considered to be a practical lower limit.

Under the test conditions approaching a current of 0.5 amps, it has been found a test duration of only several hours such as 2 to 5 hours is satisfactory to complete the testing. In contrast when the conventional salt spray method using a 5 percent salt solution is utilized, test times of several hundred hours are necessary. It is known in the art with the salt spray method involving specific test samples to have test times of 400 or 500 hours.

As previously set forth this testing technique permits an evaluation of the substrate-coating combination in two specific areas, namely 1 ability to withstand corrosion, 2 ability of the two materials to adhere to one another under adverse conditions.

The ability of the coated specimen to withstand corrosion can be visually determined by periodic examination of the coating-substrate interface. Thus by this determination the condition of the coating-substrate interface can be evaluated. This testing is particularly true when a series of different coated substrates are evaluated for corrosion at periodic time intervals with direct comparison under essentially the same corrosion conditions. A valid determination of the susceptability of the substrate coating combination is considered realized.

One way to measure the rate of corrosion at the coating-substrate interface is to periodically measure the total area of corrosion adjacent the scribed section. Illustratively corrosion and blistering will take place at the area of the interface and the immediate surrounding area. Without extensive undercutting, this total area will increase with time, and a measurement of the corroded surface permits a direct correlation of the coating combination to withstand corrosion. This measurement of disturbed surface area can be directly related to conditions of actual usage. A coated specimen whose resistance to long term corrosion conditions is known may be employed as a reference. By comparing the ability of this latter coated specimen to withstand corrosion to the test sample, a direct determination is obtainable which is considered valid over extended time periods under less adverse corrosion conditions such as exposure to the atmosphere.

Additionally the present testing method allows the determination of the ability of the coating to adhere to the substrate. For example an electric current is intermittently passed through the test sample. At the end of each passage of electric current, the sample is removed from the electrolytic bath and subjected to a tensile pull test. Preferably the sample is rinsed and dried to expose an acceptable surface prior to the adhesion test method. In this procedure, a similar technique to the known "tape" method may be employed. A tape is permitted to adhere to the coating and the tape is pulled measuring the ability of the coating to withstand this pulling force. In the method employed in the present disclosure the tape would be adhered to a coating area adjacent the scribed section. The ability of the coating to withstand the pulling force would provide a direct measurement of adherence.

Therefore the test specimen could be reintroduced in the electrolyte and the test repeated. After a preset time period, the tensile pull test could be repeated and the coating adherence measured at a new section adjacent to the scribe. In this way the adherence of various degrees of corrosion can be measured.

The dual nature of the corrosion-adherence testing is considered to provide wide versatility to the conductor-nonconductor combination of test materials. For example the oxidative conditions in the electrolytic bath may be employed for a limited period. The sample may be evaluated by the adhesion test prior to any visual blistering and adverse effect on the nonconductive coating. If the coating is removed relatively easily by the pull test, the adherence properties are unsatisfactory. With an undesirable degree of adherence, the corrosion environment in field use will produce a rapid corrosion effect.

At the other extreme in the corrosion-adherence testing is at the time the test has been operated for a prolonged time period with extended corrosion at the scribed interface. There are many diverse properties affecting corrosion-adhesion as for example the film form properties of the coating coupled with the ability to withstand abrasion. By frequent examination and adherence tests leading to the extreme corrosion, an indication of the relative merits of the coating-substrate combination may be ascertained. Satisfactory film forming properties coupled with adherence and ability to withstand corrosion is highly desirable, since otherwise blistering of the coating can form individual islands which do not provide a desirable protective barrier. In this latter event, a negative test evaluation will result.

A coating adherence test is considered to offer distinct advantages over other prior art testing methods. For example the salt spray method does not obtain a direct correlation of coating adherence except it might be correlated at least in some situations with the rate of corrosion.

If desired a series of test specimens may be employed to obtain a rapid correlation of this test method. By employing a series of essentially identical test specimens, periodically a new test specimen may be removed from the oxidative environment and measured for amount of corrosion. Thereafter a specimen in a dried condition is subjected to the tensile pull method to determine coating adhesion. Though use of a series of specimens, the tested sample need not be re-introduced into the test bath. A new sample may be periodically removed from the oxidative environment followed by a measure of the amount of corrosion and coating adherence.

To further illustrate the innovative aspects of the present invention the following example is provided:

Two galvanized steel panels 4 × 6 inches ×16 gage were processed by initially spraying them with a composition containing an equal mixture of phosphoric acid and mono-sodium phosphate at a concentration of ½ ounce per gallon and a detergent at a concentration of ¼ percent by volume. This mixture was sprayed onto the panels at a temperature of 150°F for one minute at 5 psi spray pressure. This mixture served the purpose of cleaning and roughening the surface of the samples. Following this procedure the panels were rinsed in cold water for 40 seconds at a spray pressure of 20 psi. Following the cold water rinse the panels were sprayed with the composition containing 4 ounces per hundred gallons of 100 percent chromic acid and 2 ounces per hundred gallones of 75 percent phosphoric acid. The treating temperature of this composition was 160°F.

Thereafter the panels were sprayed with a coating of an epoxy resin in powdered form which is sold by Oxyplast Limted. The panels were baked for ten minutes at 380°F and a coating thickness of approximately 2.75 mils was obtained. One coated panel was employed for the electrolytic test method while the second was tested by a salt spray technique.

The coating was scraped from ½ square inch area on each side of the top edge of one of the test panels. The coating was then scribed from one corner to another corner in the form of an X to expose the substrate. The two sides and the bottom of the panel were taped with plastic electricians' tape and a positive electrode was attached to the bare spot at the top of the panel. The panel was immersed ⅔ of its length in a 5 percent sodium chloride solution (by weight). In this salt solution a bare steel panel 4 × 6 × 0.31 inches which had been previously cleaned with detergent and acetone was immersed ⅔ of its length. The panel had a negative electrode attached to its uppermost portion. The two electrodes were attached to a rectifier by means of which a direct current of approximately 400 miliamps was impressed from one panel to the other through the salt solution.

On an hourly basis the panel was removed from the salt solution and inspected for blistering. The sample was rinsed, dried and a piece of ordinary masking tape was applied firmly and evenly along each respective leg of the scribe. The tape was then pulled sharply back upon itself.

In the first test portions at the end of one, two and three hours respectively, it was found that no paint was pulled away by the tape with an earlier visual inspection showing essentially no blistering had taken place. However the test result at the end of the fourth hour showed that one strip ¼ long × ⅛ inch wide and another strip ½ inch long and 1/16 inch wide had pulled away from the scribe. A visual inspection prior to this tape pull test showed that blistering had occurred with the coating beginning to deteriorate adjacent the scribed portion.

Since the salt spray method is a conventional test method, a coated panel processed was exposed to a salt spray. The panel was not scribed as in the previous test but was directly exposed to a 5 percent salt spray at a temperature of 95°F. Visual observation was continuously made of this sample and no blistering took place before the end of 72 hrs. Thereafter blistering did not significantly progress until the end of 200 hrs. At the end of this time several blisters of 1/16 inch in diameter were present. At the end of this period of time the coating retained its homogeneous qualities at the area adjacent to the scribe but blistering was beginning to occur.

It will be apparent that many modifications may be made within the scope and spirit of this invention and accordingly the claims are considered to be determinative of the scope of this disclosure.

What is claimed is:

1. A method for the destructive testing of a coated article wherein the article contains a nonconductive coating and a conductive substrate, said test method comprising the steps of a. exposing an area of the conducting substrate so that a coating-substrate interface exists b. immersing said coated article containing the exposed area in a liquid electrolytic bath
c. making said article the anode by connection to a direct source of current
d. exposing said article to oxidative conditions in said electrolytic bath for a period of time
e. removing said article from the electrolytic bath
f. subjecting the coated article to a tensile pull on the coating adjacent the exposed base to determine the coating adherence.

2. The method of claim 1 wherein said tensile pull involves pulling a tape adhered to the coating.

3. The method of claim 1 wherein said coated article is dried prior to said tensile pull.

4. The method of claim 1 wherein said sample is reintroduced into said bath and repeating steps c, d, e and f.

5. The method of claim 1 wherein at least two essentially identically coated articles are employed with the articles being exposed to oxidative conditions in the bath for different time periods, and determining the rate of corrosion at the coating substrate interface based at different time intervals.

6. The method of claim 1 wherein the coating is scribed to expose the substrate.

7. The method of claim 6 wherein the current in the electrolytic bath is less than 3 amps.

8. The method of claim 7 wherein said current is less than .5 amps.

9. The method of claim 1 wherein said non-conductive coating contains a resin.

10. The method of claim 1 wherein said article is a laminate.

* * * * *